US012681673B2

(12) United States Patent
Acharya Chandrashekar et al.

(10) Patent No.: US 12,681,673 B2
(45) Date of Patent: Jul. 14, 2026

(54) MANAGEMENT AND DELIVERY OF AUGMENTED REALITY CONTENT

(71) Applicant: INTERNATIONAL BUSINESS MACHINES CORPORATION, Armonk, NY (US)

(72) Inventors: Charan Acharya Chandrashekar, Bangalore (IN); Rashmi Ramachandra, Ngarbhavi (IN); Azara Khatoon, Bangalore (IN); Hemant Kumar Sivaswamy, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/954,703

(22) Filed: Nov. 21, 2024

(65) Prior Publication Data

US 2026/0140681 A1      May 21, 2026

(51) Int. Cl.
*G06F 3/14*          (2006.01)
*G06F 3/01*          (2006.01)

(52) U.S. Cl.
CPC ............... *G06F 3/14* (2013.01); *G06F 3/011* (2013.01)

(58) Field of Classification Search
None
See application file for complete search history.

(56) References Cited

U.S. PATENT DOCUMENTS

| | | | |
|---|---|---|---|
| 8,803,916 B1 | 8/2014 | Paczkowski et al. | |
| 10,497,180 B1 | 12/2019 | Perfilev et al. | |
| 2018/0091791 A1 | 3/2018 | Jiang et al. | |
| 2019/0042819 A1 | 2/2019 | Agarwal et al. | |
| 2019/0392644 A1 | 12/2019 | Keselman et al. | |
| 2020/0336706 A1 | 10/2020 | Schmirler et al. | |
| 2023/0171456 A1* | 6/2023 | Sharma .................... | G06F 3/14 |
| | | | 725/38 |
| 2024/0078805 A1 | 3/2024 | Pan et al. | |

FOREIGN PATENT DOCUMENTS

CN          107222468 B      12/2020

OTHER PUBLICATIONS

"KP9 partners with IBM to bring its WorldCAST WebAR content creation platform to more users", Auganix, https://www.auganix.org/kp9-partners-with-ibm-to-bring-its-worldcast-webar-content-creation-platform-to-more-users/, Nov. 12, 2020, 3 pages.

(Continued)

*Primary Examiner* — Aneeta Yodichkas
(74) *Attorney, Agent, or Firm* — Rakesh Roy

(57)          ABSTRACT
A method, computer system, and a computer program product for management and delivery of augmented reality (AR) content is provided. Embodiments may include receiving, by a first smart device, a request from an augmented reality (AR) user device to view a first device AR content specific to the first smart device. Embodiments may also include, retrieving, by the first smart device, the first device AR content from a local data store of the first smart device. Embodiments may further include, transmitting, by the first smart device, the first device AR content from the local data store of the first smart device to the AR user device.

20 Claims, 3 Drawing Sheets

(56) References Cited

OTHER PUBLICATIONS

"What is industrial augmented reality (IAR)?", PTC, • https://www.ptc.com/en/technologies/augmented-reality, © 2025, 7 pages.

"AR and AI: The Role of AI in Augmented Reality", Data Science IBM certification, Dec. 26, 2023, 14 pages.

"How Can You Create AR Experiences Without Internet Connectivity?", LinkedIn—Augmented Reality (AR), retrieved from web https://www.linkedin.com/advice/1/how-can-you-create-ar-experiences-without-internet-dbkle, dated Feb. 13, 2025, 15 pages.

"IBM to join MoIAT's Network of Industry 4.0 Champions", Technology, Mar. 29, 2022, 14 pages.

"Industrial Augmented Reality", Wikipedia, retrieved from web dated Feb. 13, 2025, 9 pages.

"Inventing What's Next", retrieved from web, https://researcher.watson.ibm.com/researcher/view_group.php?id=8071, dated Feb. 13, 2025, 6 pages.

"Vehicle-to-everything", Wikipedia, retrieved from web dated Feb. 13, 2025, 10 pages.

"What Is SLAM?", SLAM (Simultaneous Localization and Mapping), retrieved from web https://www.mathworks.com/discovery/slam.html, dated Feb. 13, 2025, 11 pages.

Bhattacharyya Soumalya. "The Future of Autonomous Cars with Edge Computing", Science and Technology, Jul. 7, 2023, 10 pages.

Mourtzis et al. "Cloud-Based Augmented Reality Remote Maintenance Through Shop-Floor Monitoring: A Product-Service System Approach", Journal of Manufacturing Science and Engineering, Jan. 2017, 11 pages.

Porter et al. "How Does Augmented Reality Work?", Technology and Analytics, Nov.-Dec. 2017, 3 pages.

Saran Cliff. "UCL Collaborates with IBM to Use Virtual Reality to Tackle Loneliness", ComputerWeekly.com, retrieved from web, dated Feb. 13, 2025, 5 pages.

Stockwell Scott. "A framework for Industry 4.0", IBM, Feb. 10, 2017, 14 pages.

Yusuf Kareem. "Advancing Industry 4.0 with IBM Maximo and Our Ecosystem Partners", retrieved from web https://newsroom.ibm.com/Advancing-Industry-4-0-with-the-Maximo-Ecosystem, Aug. 3, 2021, 3 pages.

* cited by examiner

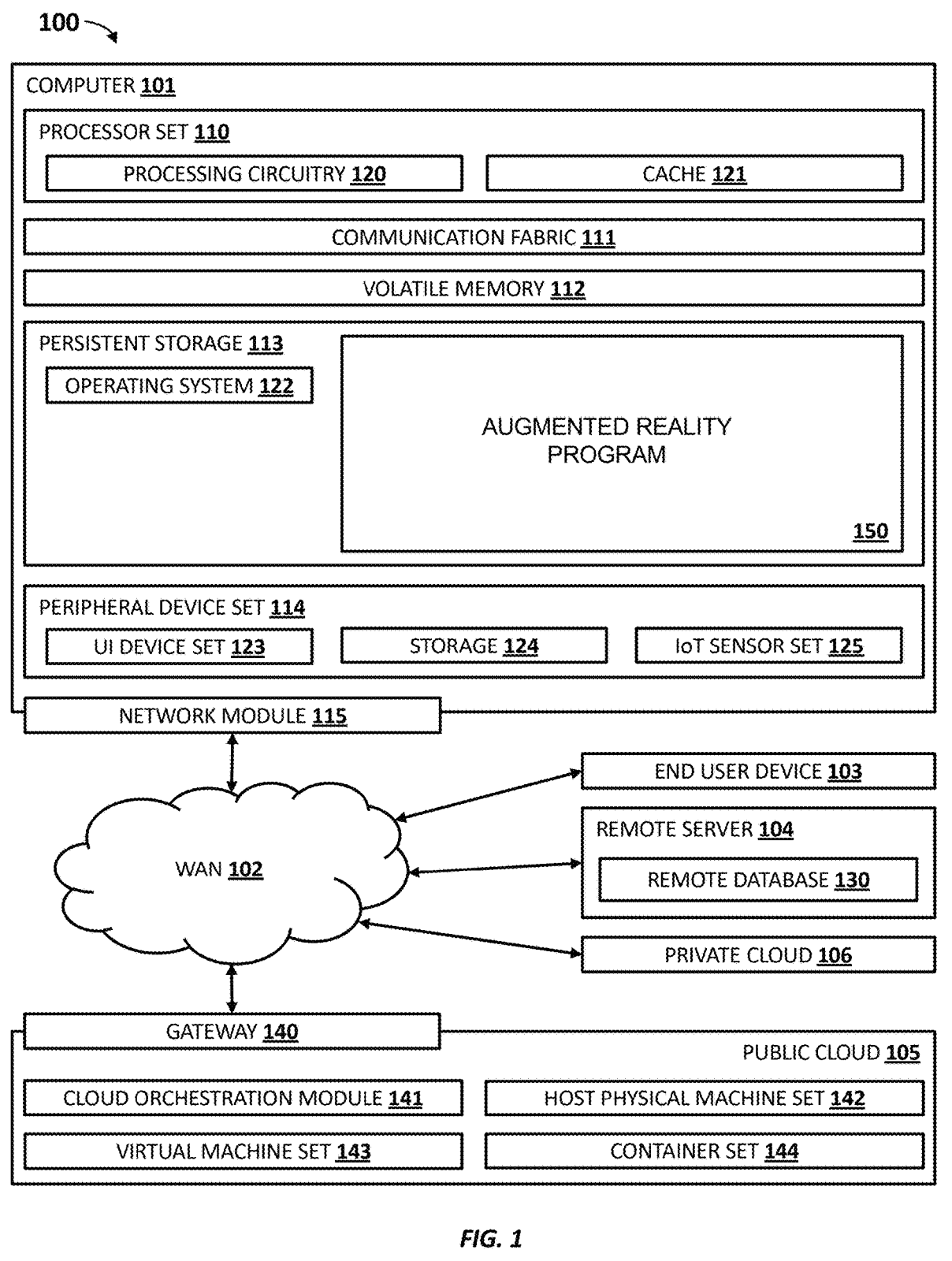

100

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

AUGMENTED REALITY PROGRAM

150

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
| VIRTUAL MACHINE SET 143 | CONTAINER SET 144 |

*FIG. 1*

MANAGEMENT AND DELIVERY OF AUGMENTED REALITY CONTENT

BACKGROUND

The present invention relates generally to the field of computing, and more particularly to augmented reality (AR) technologies.

AR tools may be implemented to superimpose digital information onto a user's physical environment via a user interface, enabling the user to interact with the digital information in the context of their environment. In order to provide an immersive AR experience, AR tools need to integrate the user's physical environment with digital elements in near real-time. Any perceptible latency in this real-time integration may negatively impact the quality, usability, and immersion of the AR experience.

SUMMARY

Embodiments of the present invention disclose a method, computer system, and a computer program product for management and delivery of AR content. Embodiments may include receiving, by a first smart device, a request from an augmented reality (AR) user device to view a first device AR content specific to the first smart device. Embodiments may also include, retrieving, by the first smart device, the first device AR content from a local data store of the first smart device. Embodiments may further include, transmitting, by the first smart device, the first device AR content from the local data store of the first smart device to the AR user device

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates a networked computing environment according to at least one embodiment;

DETAILED DESCRIPTION

Figure 2:
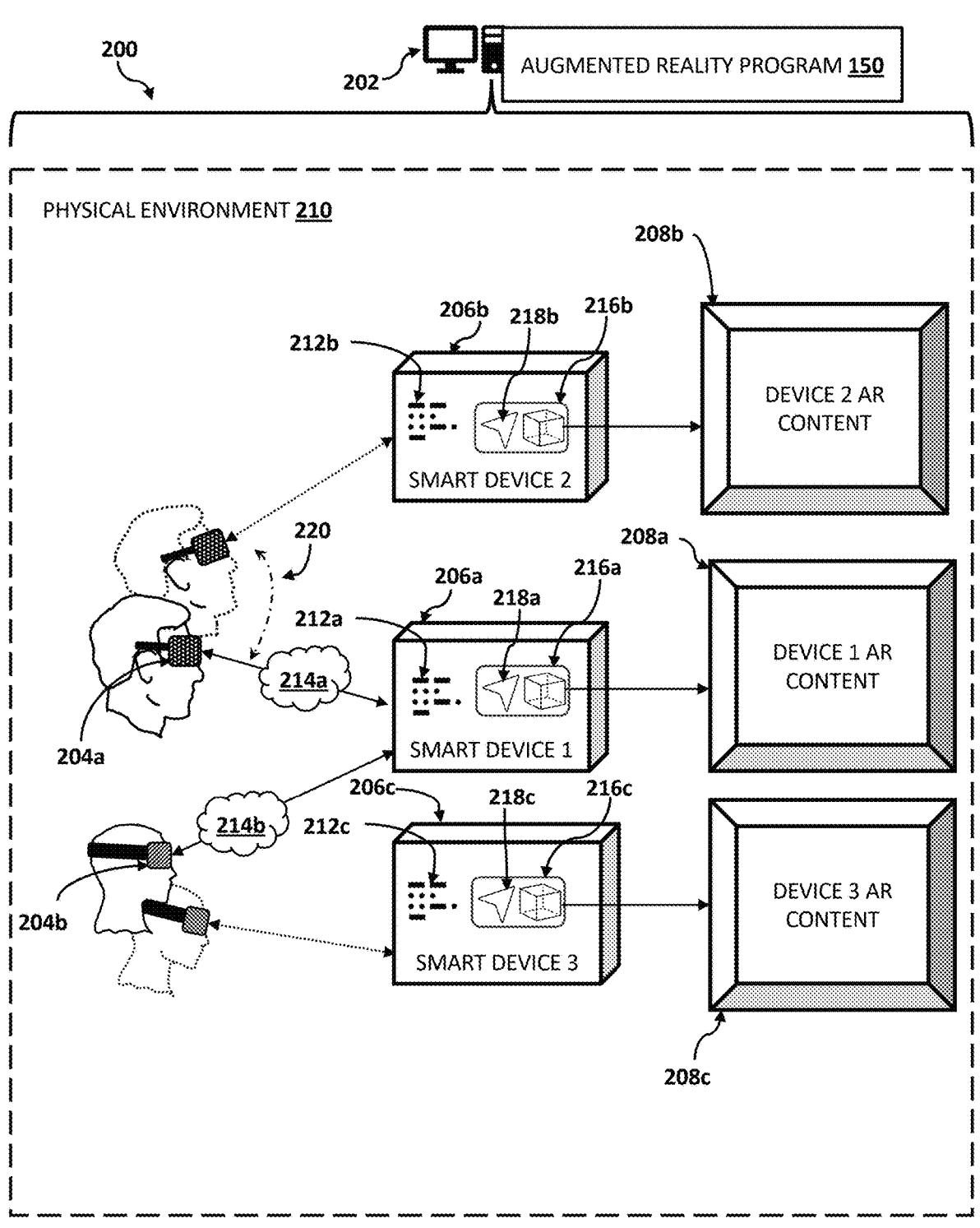
FIG. 2 is a schematic block diagram of an industrial AR environment according to at least one embodiment.

The following described exemplary embodiments provide a system, method and computer program product for managing and delivering AR content. As such, the present embodiment has the capacity to improve the technical field of AR by localizing AR content in a device that corresponds to the AR content. More specifically, an AR program on a first smart device may receive a request from an AR user device to view a first device AR content specific to the first smart device. Then, the AR program on the first smart device may retrieve the first device AR content from a local data store of the first smart device. Thereafter, the AR program on the first smart device may transmit the first device AR content from the local data store of the first smart device to the AR user device.

As described previously, AR tools may be implemented to superimpose digital information onto a user's physical environment via a user interface, enabling the user to interact with the digital information in the context of their environment. In order to provide an immersive AR experience, AR tools need to integrate the user's physical environment with digital elements in near real-time. Any perceptible latency in this real-time integration may negatively impact the quality, usability, and immersion of the AR experience.

Given the computationally-intensive nature of AR processing, AR systems typically rely on a client-server architecture where the computational burden of storing and processing AR content may be outsourced to a centralized server. In such instances, the AR content may be streamed over the internet from the centralized server to the AR client device and overlaid on the user's real-time camera view. While the centralized server may provide more computing resources than the AR client device, relying on the internet for communication between the server and the AR client device may lead to data transmission delays. As a result, the AR processing disrupted and lead to perceptible latency in the AR experience. For example, if a disruption in the internet communication causes even a few seconds delay in overlaying digital information on the user's real-time camera view, the user may find the AR experience to be frustrating and unusable. In some instances, local edge servers may be added to AR systems to decrease latency. However, this approach is problematic as it involves purchasing and maintaining additional computing resources.

Moreover, both client-server (e.g., centralized/edge server) approaches need to generate and maintain a spatial map indicating a real-time representation of the user's physical environment and the objects therein. The server may refer to the spatial map to determine which AR content to render on the AR client device based on the AR client device's location and field of view. Generating and maintaining an accurate spatial map may be time-consuming and laborious. For example, any changes to the physical environment or the objects therein (e.g., objects are moved, replaced, updated) may require that the entire mapping process be repeated.

The above-identified issues of data transfer latency, maintaining centralized/edge servers, and building and maintaining spatial maps poses problems in existing AR systems. Embodiments of the present disclosure details solutions to those problem in the context of Industrial Augmented Reality (IAR). However, it is contemplated that the solutions detailed below may also be useful in other AR applications, such as, for example, in education, entertainment, health, and commerce.

One advantageous use of the presently disclosed AR system is in the field of IAR. IAR leverages AR techniques to create and overlay work instructions, procedures, and other relevant digital information onto real-world work environments. For example, IAR may be used to assist in workforce training, manufacturing and product assembly, repair and maintenance, remote assistance, and quality assurance.

Conventional IAR systems rely on internet communication between centralized/edge servers and AR client devices, which may be vulnerable to network disruption and delay. Additionally, conventional IARs systems rely on spatial mapping of environments having complex layouts and large numbers of objects that may be moved, replaced, and updated. As such, these spatial maps may need to be frequently updated/reconstructed and the updates may need to be sent to the centralized/edge servers.

Therefore, it may be advantageous to, among other things, provide a way to implement IAR that does not depend on centralized/edge servers to hold AR contents, does not need to construct and manage industrial spatial maps, does not need internet connection to view AR content on an AR user device, and reduces data latency.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

Unless specifically stated otherwise, descriptors such as "first," "second," "third," etc. may be used herein without imputing or otherwise indicating any meaning of priority, physical order, arrangement in a list, and/or ordering in any way. Instead, these descriptors may be used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Any references in the specification to the terms "real-time," "near real-time," and "substantially real-time" may refer to occurrence in a near instantaneous manner recognizing there may be real world delays for computing time and transmission. Thus, unless otherwise specified, "real-time," "near real-time," and "substantially real-time" may refer to real-time+/−one second.

Any references in the specification to the term "illustrative" may be used to mean serving as an example, instance, or illustration. Any embodiment or design described herein as "illustrative" is not necessarily to be construed as preferred or advantageous over other embodiments or designs. The terms "at least one" and "one or more" may include any integer number greater than or equal to one, e.g., one, two, three, four, etc. The terms "a plurality" may include any integer number greater than or equal to two, e.g., two, three, four, five, etc.

Any references in the specification to "one embodiment," "an embodiment," "an example embodiment," etc., may indicate that the embodiment described can include a particular feature, structure, or characteristic, but every embodiment may or may not include the particular feature, structure, or characteristic. Moreover, such phrases may not necessarily refer to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an electromagnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 according to at least one embodiment is depicted. Computing environment 100 contains an example of an environment for the execution of at least some of the computer code involved in performing the inventive methods, such as AR program 150. In addition to AR program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and AR program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Furthermore, despite only being depicted in computer 101, AR program 150 may be stored in and/or executed by, individually or in any combination, EUD 103, remote server 104, public cloud 105, and private cloud 106.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The AR program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® (Bluetooth and all Bluetooth-based trademarks and logos are trademarks or registered trademarks of Bluetooth SIG, Inc. and/or its affiliates) connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, a user may use the AR program 150 to localize device-specific AR contents within a corresponding smart device and enable a non-internet communication network between the corresponding smart device and an AR client device. Embodiments of the present disclosure are explained in more detail below with respect to FIG. 2 and FIG. 3.

Referring now to FIG. 2, a schematic block diagram of an IAR system 200 according to at least one embodiment is depicted. According to one embodiment, the IAR system 200 may include a computer system 202 having a tangible storage device and a processor that is enabled to run the AR program 150.

According to one embodiment, the computer system 202 may include one or more AR user devices 204a, 204b (e.g., first AR user device 204a; second AR user device 204b) configured to communicate with one or more smart devices 206a, 206b, 206c (e.g., first smart device 206a; second smart device 206b; third smart device 206c) to view one or more device-specific AR content 208a, 208b, 208c (e.g., first device AR content 208a; second device AR content 208b; third device AR content 208c). While FIG. 2 only illustrates two AR user devices 204a, 204b and three smart devices 206a, 206b, 206c, it is contemplated that various embodiments may include any number of the AR user devices 204a, 204b and the smart devices 206a, 206b, 206c.

In one embodiment, the one or more AR user devices 204a, 204b may be examples of the end user device (EUD) 103 of the computer environment 100 described above with reference to FIG. 1. In one embodiment, the one or more smart devices 206a, 206b, 206c may be examples of the computer 101 of the computer environment 100 described above with reference to FIG. 1. It is contemplated that the one or more AR user devices 204a, 204b and the one or more smart devices 206a, 206b, 206c do not form a client-server computing model. As will be further detailed below, the one or more AR user devices 204a, 204b and the one or more smart devices 206a, 206b, 206c may form device-to-device connections in a physical environment 210. According to one embodiment, the IAR system 200 may be implemented in the physical environment 210. Examples of the physical environment 210 may include a factory, a warehouse, a manufacturing facility, and/or any other venue including the one or more AR user devices 204a, 204b and the one or more smart devices 206a, 206b, 206c.

According to one embodiment, the one or more AR user devices 204a, 204b may include any camera-equipped hardware that is compatible to implement AR applications (e.g., having Global Positioning System (GPS) technology, accelerometers, gyroscopes, and/or other motion sensors). Example of the one or more AR user devices 204a, 204b may include, heads-up displays, smart glasses, smart phones, or any other mobile device configured to implement AR applications.

According to one embodiment, the one or more smart devices 206a, 206b, 206c may include any electronic device having a computer that is capable of running a program, accessing/establishing a network, and/or storing/retrieving data. The one or more smart devices 206a, 206b, 206c may include various form factors, such as, for example, industrial robots, machines, factory equipment, manufactured products, appliances, and/or any other electronic device capable of storing and generating AR content.

According to one embodiment, the one or more smart devices 206a, 206b, 206c may include corresponding device communication addresses 212a, 212b, 212c (e.g., first device communication address 212a; second device communication address 212b; third device communication address 212c) digitally or physically displayed on the respective smart device in encoded form. In one embodiment, the corresponding device communication addresses 212a, 212b, 212c may be encoded in a QR code or using any other encoding form factor (e.g., barcode).

As will be further detailed below, the corresponding device communication addresses 212a, 212b, 212c of the respective one or more smart devices 206a, 206b, 206c may enable the one or more AR user devices 204a, 204b to establish a corresponding communication network 214a, 214b between the one or more AR user devices 204a, 204b and the respective one or more smart devices 206a, 206b, 206c. For example, the first AR user device 204a may scan a QR code to decode the first communication address 212a associated with the first smart device 206a. Then, the first AR user device 204a may send a communication request to the first communication address 212a of the first smart device 206a to dynamically establish a first communication network 214a between the first AR user device 204a and the first smart device 206a. Similarly, the second AR user device 204b may also send a communication request to the first communication address 212a associated with the first smart device 206a to dynamically establish a second communication network 214b between the second AR user device 204b and the first smart device 206a.

According to one embodiment, the communication networks 214a, 214b may enable direct device-to-device communication without an internet or cellular service (e.g., non-internet-based communication network). In various embodiments, the communication networks 214a, 214b may include a localized network implemented using short-range wireless technologies. In one embodiment, the communication networks 214a, 214b may be implemented using Wi-Fi Direct® (Wi-Fi and all Wi-Fi-based trademarks and logos are trademarks or registered trademarks of Wi-Fi Alliance and/or its affiliates), Bluetooth® (Bluetooth and all Bluetooth-based trademarks and logos are trademarks or registered trademarks of Bluetooth SIG, Inc. and/or its affiliates), local-only hotspot, mesh network, and/or any other radio wave technology that may enable communication without relying on the internet.

According to one embodiment, the one or more smart devices 206a, 206b, 206c may include corresponding local data stores 216a, 216b, 216c (e.g., first local data store 216a; second local data store 216b; third local data store 216c). In one embodiment, the corresponding local data stores 216a, 216b, 216c may be examples of storage 124 described with reference to the computer environment 100 of FIG. 1.

According to one embodiment, the one or more device-specific AR contents 208a, 208b, 208c may be stored in and retrieved from the corresponding local data stores 216a, 216b, 216c of the respective one or more smart devices 206a, 206b, 206c. Thus, in one embodiment, the first device AR content 208a may be stored in and retrieved from the first local data store 216a of the first smart device 206a. Similarly, the second device AR content 208b may be stored in and retrieved from the second local data store 216b of the second smart device 206b, and the third device AR content 208c may be stored in and retrieved from the third local data store 216c of the third smart device 206c. In one embodiment, the one or more device-specific AR contents 208a, 208b, 208c in the local data stores 216a, 216b, 216c may include, device-specific user manuals, device-specific status information, device-specific task information. In at least one embodiment, the one or more device-specific AR contents 208a, 208b, 208c in the local data stores 216a, 216b, 216c may also include device-specific AR three-dimensional (3D) models (e.g., digital twin) and any details related to the models such as, for example, anchoring orientation and geographical coordinates of the specific device in the physical environment 210.

According to one embodiment, the corresponding local data stores 216a, 216b, 216c of the respective one or more smart devices 206a, 206b, 206c may also store the corresponding device communication addresses 212a, 212b, 212c of one or more adjacent smart devices. Thus, the first local data store 216a of the first smart device 206a may store a first adjacent device data 218a, the second local data store 216b of the second smart device 206b may store a second adjacent device data 218b, and the third local data store 216c of the third smart device 206c may store a third adjacent device data 218c.

In one embodiment, the second smart device 206b may be adjacent to the first smart device 206a and thus, the first adjacent device data 218a in the first local data store 216a may include the second device communication address 212b and a respective position (e.g., coordinates) of the second smart device 206b relative to the first smart device 206a. In that embodiment, the second adjacent device data 218b in the second local data store 216b may include the first device communication address 212a and a respective position (e.g., coordinates) of the first smart device 206a relative to the second smart device 206b. In at least one embodiment, the first adjacent device data 218a, the second adjacent device data 218b, and the third adjacent device data 218c may each include a plurality of communication addresses and relative positions corresponding to a number of smart devices adjacent to the respective one or more smart devices 206a, 206b, 206c. For example, the third smart device 206c may be adjacent to the first smart device 206a and thus, the first adjacent device data 218a in the first local data store 216a may include both the second device communication address 212b and the third device communication address 212c, as well as the positions of each of the adjacent devices relative to the first smart device 206a.

Generally, the AR program 150 may be implemented by the computer system 202 to localize the one or more device-specific AR contents 208a, 208b, 208c in the local data stores 216a, 216b, 216c of the respective one or more smart devices 206a, 206b, 206c and enable a non-internetbased communication network between the respective one or more smart devices 206a, 206b, 206c and the one or more AR user devices 204a, 204b.

In one embodiment, the AR program 150 may include a single computer program or multiple program modules or sets of instructions being executed by the processor of the computer system 202 (e.g., one or more AR user devices 204a, 204b; one or more smart devices 206a, 206b, 206c). In one embodiment, the AR program 150 may include routines, objects, components, units, logic, data structures, and actions that may perform particular tasks or implement particular abstract data types. In one embodiment, the AR program 150 may be executed locally by the one or more AR user devices 204a, 204b and the one or more smart devices 206a, 206b, 206c, which may be linked through the corresponding communication networks 214a, 214b (e.g., non-internet-based communication networks).

In an exemplary operation, a first user may interact with the first AR user device 204a to scan a QR code (encoding first communication address 212a) located on the first smart device 206a. Then, the first AR user device 204a may decode the QR code and transmit a communication request to the first communication address 212a encoded in the QR code. In one embodiment, the first smart device 206a may receive the communication request from the first AR user device 204a and implement an authentication and authorization process to determine whether to provide access to the first AR user device 204. In one embodiment, the authentication and authorization process may include, for example, two-factor authentication (2FA), multi-factor authentication (MFA), identity and access management (IAM), and/or any other security access management technology.

According to one embodiment, once the first AR user device 204a has been authenticated and authorized by the first smart device 206a, the first smart device 206a may dynamically establish the communication network 214a. As noted previously, the communication network 214a may include a non-internet-based communication network. In one embodiment, the first smart device 206a may render a 3D Menu on the first AR user device 204 and the first user may interact with the 3D menu to select from different first device AR content 208a options such as, for example, user guide, training material, health of the machine, and/or status of tasks. Based on the selection, the first smart device 206a may render the appropriate first device AR content 208a.

According to one embodiment, the first AR user device 204a may receive a video stream from the associated user's field of view (FOV), tracking the physical environment 210 and the first smart device 206a in the FOV. In addition to the video stream of the user's FOV, the first AR user device 204a perform head/eye tracking to determine the user's FOV. In one embodiment, the first AR user device 204a may collect motion data from various motion sensors (e.g., gyroscopes, accelerometers, GPS) to track the position and orientation of the first AR user device 204a in the physical environment 210. In one embodiment, the position and orientation components of the motion data may be used to calculate pose data of the first AR user device 204a (e.g., head position and orientation).

According to one embodiment, the first AR user device 204a may transmit (e.g., via communication network 214a) the user's FOV data, pose data, and motion data to the first smart device 206a being viewed by the user through the first AR user device 204a. In one embodiment, the first smart device 206a may retrieve the first device AR content 208a corresponding to the user's FOV data from the first local data store 216a of the first smart device 206a. In one embodiment, the first smart device 206a may dynamically process and render the first device AR content 208a to match the user's FOV, pose (e.g., first AR user device 204a position and orientation), and motion and transmit the first device AR content 208a to the first AR user device 204a. In one embodiment, the first AR user device 204a camera feed may be overlaid with the first device AR content 208a such that the first device AR content 208 seems superimposed on the user's FOV in near real-time.

According to one embodiment, in order to avoid performance issues (e.g., latency), the first smart device 206a may also predict the user's future FOV and pre-render the corresponding first device AR content 208. This prediction may be implemented by calculating a small projection in time based on the user's current pose data, current motion data, and any changes in the motion data (e.g., based on acceleration/deceleration/rotation).

According to one embodiment, at the same time that the first AR user device 204a is interacting with the first smart device 206a via the first communication network 214a, the second AR user device 204b may also interact with the first smart device 206a via the second communication network 214b. As such, a plurality of users may use their corresponding AR user devices to view different portions of first smart device 206a and the first smart device 206a may simultaneously transmit the appropriate first device AR content to the corresponding AR user devices based on the respective FOV data, pose data, and motion data. As such, the first device AR content received by each AR user device of the plurality of AR user devices may be based on the respective FOV data, pose data, and motion data of the plurality of AR devices.

According to one embodiment, the AR program 150 may enable the first AR user device 204a to seamlessly connect to adjacent machines (e.g., second smart device 206b). The first smart device 206a may store a plurality of adjacent machines' communication address and respective location. In one embodiment, the second smart device 206b may be adjacent to the first smart device 206a and thus, the first adjacent device data 218a in the first local data store 216a may include the second device communication address 212b and position (e.g., coordinates) in the physical environment 210 relative to the first smart device 206a.

In one embodiment, as the first AR user device 204a switches the FOV from the first smart device 206a to the second smart device 206b that is adjacent to first smart device 206a, the first smart device 206a may detect a threshold FOV switch 220. In response to detecting the threshold FOV switch 220, the first smart device 206a may dynamically transmit the second device communication address 212b (e.g., stored as the first adjacent device data 218a in the first local data store 216a) to the first AR user device 204a. In one embodiment, the first AR user device 204a may then send a request to the second device communication address 212b and establish the first communication network 214a between the first AR user device 204a and the second smart device 206b.

According to one embodiment, the FOV of the first AR user device 204a may similarly seamlessly switch from the second smart device 206b to the first smart device 206a since the second adjacent device data 218b in the second local data store 216b of the second smart device 206b may include the first device communication address 212a. It is contemplated that the AR program 150 may similarly enable the second AR user device 204b to dynamically connect and switch between adjacent smart devices based on detecting the threshold FOV switch 220 between first smart device 206*a* and third smart device 206*c* (not specifically illustrated in FIG. 2).

According to one embodiment, if there are any physical or logical updates to the one or more smart devices 206*a*, 206*b*, 206*c* that may impact the one or more device-specific AR content 208*a*, 208*b*, 208*c*, then the AR content updates may be directly sent to the corresponding smart device 206*a*, 206*b*, 206*c*.

one or more smart devices 206*a*, 206*b*, 206*c* (e.g., first smart device 206*a*; second smart device 206*b*; third smart device 206*c*) to view one or more device-specific AR content 208*a*, 208*b*, 208*c*

Figure 3:
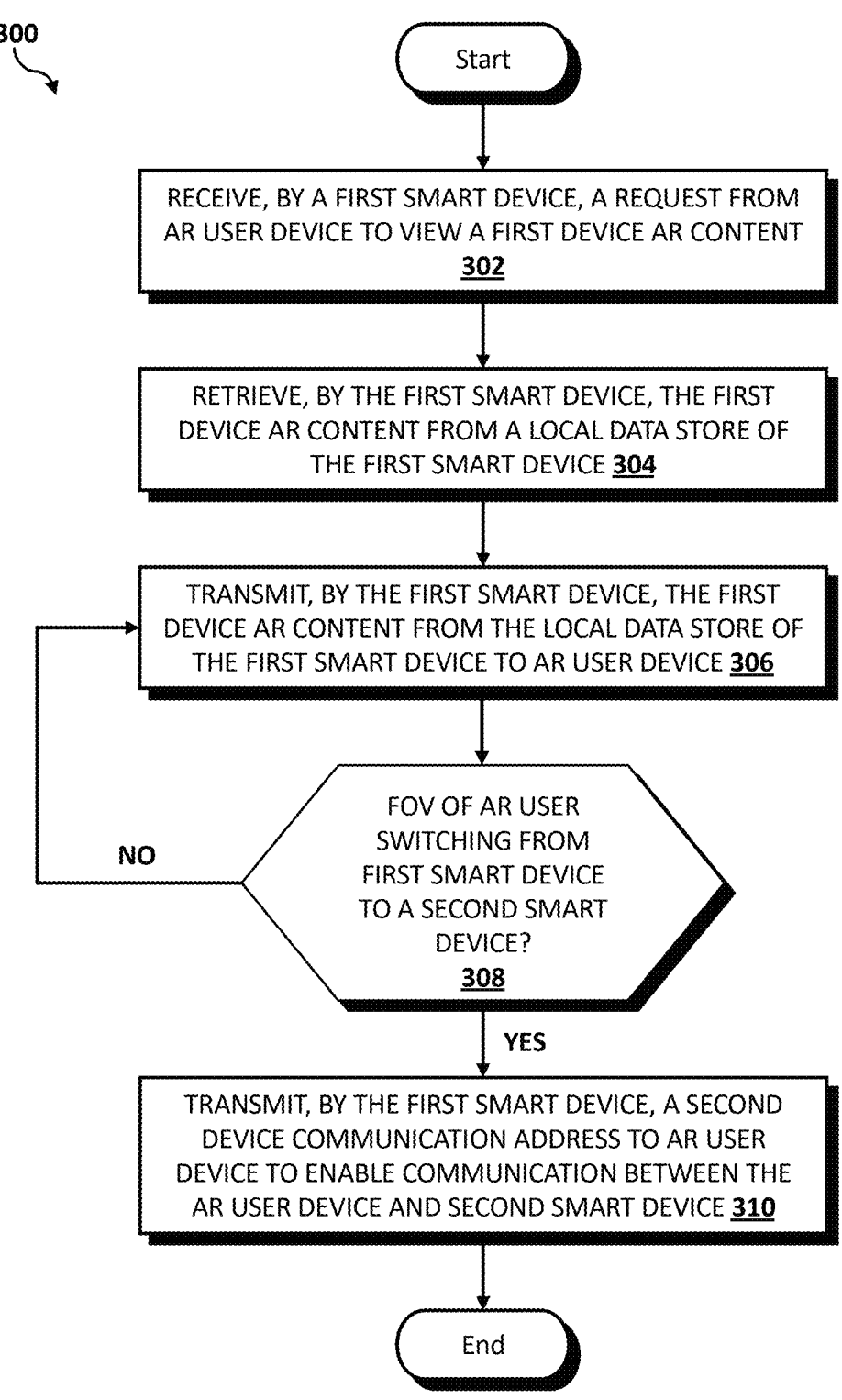
FIG. 3 is an operational flowchart illustrating a process for AR implementation in an industrial AR system according to at least one embodiment.

Referring now to FIG. 3, an operational flowchart illustrating an exemplary process 300 used by the AR program 150 according to at least one embodiment is depicted. FIG. 3 provides a description of process 300 with reference to the IAR system 200 (FIG. 2).

At 302, a first smart device receives a request from an AR user device to view a first device AR content specific to the first smart device. According to one embodiment, the AR program 150 running on the AR user device may enable the AR user device to transmit a communication request to a first device communication address of the first smart device. In one embodiment, the AR program 150 running on the first smart device may enable the first smart device to receive the communication request from the AR user device and implement an authentication and authorization process to determine whether to provide access to the AR user device. Once the AR user device has been authenticated and authorized by the first smart device, the AR program may enable the first smart device to dynamically establish a communication network (e.g., non-internet-based communication network) between the first smart device and the AR user device.

Then at 304, the first smart device retrieves the first device AR content from a local data store of the first smart device. According to one embodiment, the AR program 150 may enable the first smart device to receive field of view (FOV) data, pose data, and motion data from the AR user device via the communication network established between the two devices (e.g., first smart device and AR user device). In one embodiment, the FOV data may be based on a video stream captured by the AR user device from the associated user's FOV and the pose data may be based on the position and orientation components of the motion data captured by motion sensors in the AR user device. In one embodiment, the AR program 150 may enable the first smart device to retrieve the first device AR content corresponding to the user's FOV data from the local data store of the first smart device. Then, the AR program 150 may enable the first smart device to dynamically process and render the first device AR content based on the user's FOV, pose (e.g., AR user device position and orientation), and motion data.

Then at 306, the first smart device transmits the first device AR content from the local data store of the first smart device to the AR user device. According to one embodiment, the AR program 150 may enable the first smart device to transmit the first device AR content to the AR user device. In one embodiment, the AR program 150 may enable the AR user device camera feed to be overlaid with the first device AR content such that the first device AR content seems superimposed on the FOV of the AR user device in near real-time.

Then at 308, the first smart device determines if a FOV of the AR user device has switched to a second smart device. According to one embodiment, the AR program 150 may enable the first smart device to process the FOV data from the AR user device to determine if the FOV of the AR user device is switching from the first smart device to the second smart device. In one embodiment, the AR program 150 may enable the first smart device to detect a threshold FOV switch based on the video stream associated with the FOV (e.g., video stream includes the second smart device). If at 308, the first smart device does not detect the threshold FOV switch ("no" branch), the process 300 may return to 306 and the AR program 150 may enable the first smart device to continue transmitting the first device AR content from the local data store of the first smart device to the AR user device. However, if at 308, the first smart device detects the threshold FOV switch, the process 300 proceeds to 310.

At 310, if the first smart device detects the FOV of the AR user device switching from the first smart device to the second smart device, the first smart device transmits a second device communication address to the AR user device to enable communication between the AR user device and the second smart device. According to one embodiment, the AR program 150 may enable the first smart device to store a first adjacent device data in the local data store of the first smart device. In one embodiment, the first adjacent device data may include the second device communication address and a respective position (e.g., coordinates) of the second smart device relative to the first smart device. In response to detecting the threshold FOV switch, the AR program 150 may enable the first smart device to dynamically transmit the second device communication address the AR user device. In one embodiment, the AR user device may then send a communication request to the second device communication address and establish a communication network (e.g., non-internet-based) between the AR user device and the second smart device. Thereafter, the AR program 150 may dynamically implement process 300 between the AR user device and the second smart device.

It is contemplated that the AR program 150 may provide several advantages and/or improvements to the technical field of AR. The AR program 150 may also improve the functionality of a computer because the AR program 150 may enable the computer to localize AR contents within the computer and enable a non-internet communication network between the computer a plurality of AR user devices.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a first smart device, a request from an augmented reality (AR) user device to view a first device AR content stored on the first smart device, wherein the first device AR content is specific to the first smart device;

retrieving, by the first smart device, the first device AR content from a local data store of the first smart device; and transmitting, by the first smart device, the first device AR content from the local data store of the first smart device to the AR user device.

2. The computer-implemented method of claim 1, further comprising:

detecting, by the first smart device, a field of view (FOV) of the AR user device switching from the first smart device to a second smart device; and transmitting, by the first smart device, a second device communication address to the AR user device to enable communication between the AR user device and the second smart device.

3. The computer-implemented method of claim 1, wherein the request from the AR user device is received by the first smart device at a first device communication address, wherein the first device communication address is displayed on the first smart device.

4. The computer-implemented method of claim 1, further comprising:

establishing, by the first smart device, a non-internet communication network with the AR user device based on receiving the request from the AR user device at a first device communication address.

5. The computer-implemented method of claim 1, further comprising:

receiving, by the first smart device, FOV data, pose data, and motion data from the AR user device;

retrieving, by the first smart device, from the local data store of the first smart device, the first device AR content corresponding to the FOV data, wherein the FOV data indicates a portion of the first smart device viewed through the AR user device; and dynamically rendering, by the first smart device, the first device AR content based on the pose data and the motion data from the AR user device.

6. The computer-implemented method of claim 1, further comprising:

storing in the local data store of the first smart device, a plurality of communication addresses corresponding to a plurality of smart devices adjacent the first smart device.

7. The computer-implemented method of claim 1, further comprising:

simultaneously transmitting, by the first smart device, the first device AR content from the local data store of the first smart device to a plurality of AR user devices, wherein the first device AR content received by each AR user device of the plurality of AR user devices is based on respective FOV data, pose data, and motion data of the plurality of AR user devices.

8. A computer system comprising:

a processor set;

one or more computer-readable storage media; and program instructions stored on the one or more computer-readable storage media to cause the processor set to perform operations comprising:

receiving, by a first smart device, a request from an augmented reality (AR) user device to view a first device AR content stored on the first smart device, wherein the first device AR content is specific to the first smart device;

retrieving, by the first smart device, the first device AR content from a local data store of the first smart device; and transmitting, by the first smart device, the first device AR content from the local data store of the first smart device to the AR user device.

9. The computer system of claim 8, wherein the operations further comprise:

detecting, by the first smart device, a field of view (FOV) of the AR user device switching from the first smart device to a second smart device; and transmitting, by the first smart device, a second device communication address to the AR user device to enable communication between the AR user device and the second smart device.

10. The computer system of claim 8, wherein the request from the AR user device is received by the first smart device at a first device communication address, and wherein the first device communication address is displayed on the first smart device.

11. The computer system of claim 8, wherein the operations further comprise:

establishing, by the first smart device, a non-internet communication network with the AR user device based on receiving the request from the AR user device at a first device communication address.

12. The computer system of claim 8, wherein the operations further comprise:

receiving, by the first smart device, FOV data, pose data, and motion data from the AR user device;

retrieving, by the first smart device, from the local data store of the first smart device, the first device AR content corresponding to the FOV data, wherein the FOV data indicates a portion of the first smart device viewed through the AR user device; and dynamically rendering, by the first smart device, the first device AR content based on the pose data and the motion data from the AR user device.

13. The computer system of claim 8, wherein the operations further comprise:

storing in the local data store of the first smart device, a plurality of communication addresses corresponding to a plurality of smart devices adjacent the first smart device.

14. The computer system of claim 8, wherein the operations further comprise:

simultaneously transmitting, by the first smart device, the first device AR content from the local data store of the first smart device to a plurality of AR user devices, wherein the first device AR content received by each AR user device of the plurality of AR user devices is based on respective FOV data, pose data, and motion data of the plurality of AR user devices.

15. A computer program product comprising:

one or more computer-readable storage media; and program instructions stored on the one or more computer-readable storage media to perform operations comprising:

receiving, by a first smart device, a request from an augmented reality (AR) user device to view a first device AR content stored on the first smart device, wherein the first device AR content is specific to the first smart device;

retrieving, by the first smart device, the first device AR content from a local data store of the first smart device; and transmitting, by the first smart device, the first device AR content from the local data store of the first smart device to the AR user device.

16. The computer program product of claim 15, wherein the operations further comprise:

detecting, by the first smart device, a field of view (FOV) of the AR user device switching from the first smart device to a second smart device; and transmitting, by the first smart device, a second device communication address to the AR user device to enable communication between the AR user device and the second smart device.

17. The computer program product of claim 15, wherein the request from the AR user device is received by the first smart device at a first device communication address, and wherein the first device communication address is displayed on the first smart device.

18. The computer program product of claim 15, wherein the operations further comprise:

establishing, by the first smart device, a non-internet communication network with the AR user device based on receiving the request from the AR user device at a first device communication address.

19. The computer program product of claim 15, wherein the operations further comprise:

receiving, by the first smart device, FOV data, pose data, and motion data from the AR user device;

retrieving, by the first smart device, from the local data store of the first smart device, the first device AR content corresponding to the FOV data, wherein the FOV data indicates a portion of the first smart device viewed through the AR user device; and dynamically rendering, by the first smart device, the first device AR content based on the pose data and the motion data from the AR user device.

20. The computer program product of claim 15, wherein the operations further comprise:

storing in the local data store of the first smart device, a plurality of communication addresses corresponding to a plurality of smart devices adjacent the first smart device.

* * * * *